United States Patent
Wernaers

(10) Patent No.: US 8,107,553 B2
(45) Date of Patent: Jan. 31, 2012

(54) CREST FACTOR REDUCTION IN MULTICARRIER TRANSMISSION SCHEMES

(75) Inventor: Yves Wernaers, Teralfene (BE)

(73) Assignee: ST-Ericsson SA, Geneva (CH)

( * ) Notice: Subject to any disclaimer, the term of this patent is extended or adjusted under 35 U.S.C. 154(b) by 1084 days.

(21) Appl. No.: 11/818,900

(22) Filed: Jun. 15, 2007

(65) Prior Publication Data

US 2008/0292010 A1 Nov. 27, 2008

(30) Foreign Application Priority Data

Jul. 3, 2006 (EP) .................................. 06013716

(51) Int. Cl.
*H04L 27/00* (2006.01)
(52) U.S. Cl. ........................................................ 375/295
(58) Field of Classification Search .................. 375/295
See application file for complete search history.

(56) References Cited

U.S. PATENT DOCUMENTS

| | | | | |
|---|---|---|---|---|
| 5,682,419 | A * | 10/1997 | Grube et al. | 455/450 |
| 2001/0012783 | A1* | 8/2001 | Peeters et al. | 455/500 |
| 2002/0106010 | A1* | 8/2002 | Jones | 375/219 |
| 2002/0126768 | A1* | 9/2002 | Isaksson et al. | 375/298 |
| 2002/0126773 | A1* | 9/2002 | Brunel | 375/340 |
| 2003/0233481 | A1* | 12/2003 | Katayama et al. | 709/250 |
| 2004/0093545 | A1* | 5/2004 | Khandani et al. | 714/746 |
| 2004/0218689 | A1* | 11/2004 | Akhtman | 375/296 |
| 2005/0175068 | A1* | 8/2005 | Nakache et al. | 375/130 |
| 2006/0013259 | A1* | 1/2006 | Chari et al. | 370/482 |
| 2008/0089271 | A1* | 4/2008 | Godwin et al. | 370/319 |
| 2009/0279422 | A1* | 11/2009 | Fonseka et al. | 370/215 |

OTHER PUBLICATIONS

Hanzo, Webb, Keller: *Single-and multi-carrier Quadrature Amplitude Modulation*, Jan. 1, 2000, Wiley Chichester. U.K., pp. 553-612, XP-000863934.

European Search Report from European Patent Application 06013716, filed Jul. 3, 2006.

Krongold B.S. et al. "PAR reduction in OFDM via active constellation extension" IEEE Transactions on Broadcasting, IEEE Service Center, Piscataway, NH, US, vol. 49, No. 3, Sep. 2003, pp. 258-268, XP002303893 ISSN: 0018-9316.

Jones D.L. "Peak power reduction in OFDM and DMT via active channel modification" Signals, Systems, and Computers, 1999. Conference Record of the Thirty-Third Asilomar Conference on Oct. 24-27, 1999, Piscataway, NH, USA, IEEE, US, vol. 2, Oct. 24, 1999, pp. 1076-1079, XP010373802 ISBN: 0-7803-5700-0.

Fazel M. et al. "Amplitude and Sign Adjustment for Peak-To Average-Power Reduction" IEEE Transactions on Communications, IEEE Service Center, Piscataway, NJ, US, vol. 53, No. 8, Aug. 2005, pp. 1243-1247, XP011137815 ISSN: 0090-6778.

* cited by examiner

*Primary Examiner* — David C. Payne
*Assistant Examiner* — Erin File
(74) *Attorney, Agent, or Firm* — Wolf, Greenfield & Sacks, P.C; James H. Morris

(57) ABSTRACT

A multicarrier transmission system uses a set of carriers spaced apart in frequency with a number of bits being assigned to each carrier. A transmitter has a mapper which maps a data signal to a parallel set of constellation values. A frequency domain-to-time domain transform stage converts the set of modulated carriers to a time-domain signal. A peak detector detects when the time-domain signal exceeds a predetermined criterion. A constellation modifier modifies the constellation value of at least one of the carriers to reduce the crest factor of the transmitted signal. A carrier is selected for modifying on the basis of a number of bits allocated to that carrier. The constellation modifier can select an alternative constellation value by an iterative method or by calculation. The constellation modifier can operate entirely in the time-domain.

35 Claims, 5 Drawing Sheets

CREST FACTOR REDUCTION IN MULTICARRIER TRANSMISSION SCHEMES

BACKGROUND OF THE INVENTION

1. Field of the Invention

This invention relates to multicarrier transmission schemes such as Discrete Multitone (DMT) and Orthogonal Frequency Division Multiplexing (OFDM) as well as to transmitter, receiver, and/or transceiver apparatus and methods.

2. Discussion of the Related Art

Multicarrier transmission schemes such as DMT and OFDM are becoming widely used in such areas as Digital Subscriber Line (xDSL), Digital Audio Broadcasting (DAB), Digital Video Broadcasting (e.g. DVB-T, DVB-S, DVB-H) and wireless Local Area Networks. Multicarrier transmission schemes have many advantages, including high spectrum efficiency, resistance to interferers and noise and resistance against multipath interference. One less desirable property of multicarrier transmission schemes is that the transmitted signal has a very high crest factor. The crest factor of a signal is defined as the ratio of the peak amplitude of the signal to the Root Mean Square (RMS) value of the signal. This is also known as Peak to Average Ratio (PAR). The high crest factor poses challenges for the analog front-end design of a multicarrier transmitter and increases the power consumption of the front-end, largely due to the needs of the power amplifier.

One known solution to reduce crest factor is to clip the signal, before transmission. Indeed, the digital to analog converter (DAC) in a multicarrier transmitter may inherently clip the signal if the signal exceeds the range of the DAC. Clipping has a disadvantage of distorting the signal, which can result in erroneously decoded data symbols and hence bit errors at a receiver. In frequency division multiplexed systems, such as digital subscriber line (xDSL), where signals for the upstream and downstream paths are frequency multiplexed, clipping in one path can cause errors in the other path. Another known solution to limit crest factor is to use pulse shaping techniques, which can reduce the harsh effects of clipping. However, if pulse-shaping is used there is a need for extra filtering in the analog front-end of receivers to remove the out-of-band distortion which pulse-shaping incurs and this also increases the cost of transmitters. A further known method to reduce crest factor reserves certain ones of the carriers (tones) to create symbols with lower crest factor but this has the disadvantage of permanently decreasing the data rate. A further known method reserves some bits for messaging between transmitter and receiver in order to properly decode the modified symbols (with lower crest factor). This also has a disadvantage of a permanently decreased data rate and requires compatible receivers.

U.S. Pat. No. 6,757,299 describes peak power to average power reduction in multicarrier communication systems. A subcarrier symbol is identified which has maximum effect on a peak in a frame and the symbol on this carrier is modified to reduce the peak. This method concentrates solely on reducing peak size, which could incur a high or unacceptable bit error rate. Once a peak has been detected, the method requires a new symbol to be computed and then transformed from the frequency domain to the time-domain.

The present invention seeks to provide an improved way of reducing the crest factor in a multicarrier transmission scheme.

SUMMARY OF THE INVENTION

It is an object of the present invention to provide improved multicarrier transmission schemes such as Discrete Multitone (DMT) and Orthogonal Frequency Division Multiplexing (OFDM) as well as transmitter, receiver, and/or transceiver apparatus and methods.

Accordingly, a first aspect of the present invention provides a transmitter for a multicarrier transmission system which uses a set of carriers spaced apart in frequency, a number of bits being assigned to each carrier, the transmitter comprising:

an input for receiving a data signal for transmission;

a mapper arranged to map the data signal to a parallel set of constellation values, where each constellation value determines modulation of one carrier in the set of carriers;

a frequency domain-to-time domain transform stage arranged to convert the set of modulated carriers to a time-domain signal;

a peak detector arranged to detect when the time-domain signal exceeds a predetermined criterion;

a constellation modifier arranged to modify the constellation value of at least one of the carriers, wherein the constellation modifier is arranged to select a carrier for modifying on the basis of a number of bits allocated to that carrier.

Selecting a carrier for modifying on the basis of the number of bits allocated to the carrier minimizes the impact on BER. The error which is caused by modifying the constellation value can be concealed by error correction coding applied to the data signal. Rather than clipping (and hence corrupting) many carriers, only one or more carriers are lost in a controlled manner. By selecting carriers in this way, the total impact of the clipping is significantly reduced. There is not a permanent reduction in data rate, and no clipping distortion is introduced in the proper receive path. A reduced crest factor lowers the requirements and power consumption for the analog front-end, particularly the power amplifier. Modifying a transmitter in this manner has no impact on the receiver. One or more carriers can be selected and modified, and the number of selected carriers can be modified during use.

Preferably, the constellation modifier is arranged to select a modified constellation value which will place a peak of opposite polarity at, or near to, the position of a peak in the time-domain signal. Some standards which define transmission schemes require a transmitter to always transmit a valid constellation value while others allow more flexibility. The constellation modifier can be arranged to always modify the constellation value to a valid value, i.e. the modified value is a valid value within the constellation, even though the modified constellation value will no longer correspond correctly to the data which was intended to be mapped to that carrier. Alternatively, the constellation modifier can be arranged to modify a carrier to a non-valid value. This can have an advantage of better aligning the position of a peak in the modified carrier with the peak (of opposite polarity) in the multicarrier signal.

The constellation modifier can be arranged to select a plurality of predetermined alternative constellation values and the peak detector can determine the best one of the alternative constellation values based on the effect of the alternative constellation value on the time-domain signal. Preferably the predetermined alternative constellation values are the constellation values of largest amplitude, which are to be found at the four 'corners' of the constellation, when the constellation is plotted as a constellation diagram. The modified constellation value can be selected by an iterative method, which repeatedly modifies a constellation value and determines the effect of each alternative constellation value on the overall signal. Alternatively, a constellation value can be modified by calculating the position, in time, of a peak in the selected carrier.

In an alternative form, the constellation modifier can be arranged to modify the constellation value of at least one of the carriers in the time-domain, without the need to re-perform the frequency domain-to-time domain transform.

A further aspect of the invention provides a method of reducing the crest factor of a transmitted signal in a multicarrier transmission system which uses a set of carriers spaced apart in frequency, each carrier being assigned a number of bits, the method comprising:

receiving a data signal for transmission;

mapping the data signal to a parallel set of constellation values, where each constellation value determines modulation of one carrier in the set of carriers;

applying a frequency domain-to-time domain transform to the set of modulated carriers to generate a time-domain signal;

detecting when the time-domain signal exceeds a predetermined criterion;

modifying the constellation value of at least one of the carriers, wherein a carrier is selected for adjustment on the basis of a number of bits allocated to that carrier.

The selection of the carrier for adjustment may be one having the fewest bits allocated to it. The selection can, for example, be of at least two carriers having the fewest bits allocated to them. The selection can be of a plurality of predetermined alternative constellation values and it can be determined in the method which is the best one of the alternative constellation values based on the effect of the alternative constellation value on the time-domain signal. In the method the predetermined alternative constellation values can be the constellation values of largest amplitude. The modification of the constellation value can be selected to be only to a valid constellation value. In the method a modified constellation value for the selected carrier can be used and the frequency domain-to-time domain transform convert the modified set of modulated carriers to a time-domain signal after each modification. In the method the selection of a modified constellation value can be such that it places a peak of opposite polarity at, or near to, the position of a peak in the time-domain signal. In the method the modification of the constellation value of at least one of the carriers can be carried out in the time-domain. In the method a time-domain representation of a carrier can be stored or buffered and the selected carrier can be removed from the time-domain signal and added to the stored time-domain representation of a carrier to the signal at a relative phase which will place a peak of opposite polarity at, or substantially at, the position of a peak in the time-domain signal. The removal of the selected carrier from the time-domain signal can be performed by subtracting a scaled and time-shifted version of the time-domain representation of the carrier from the signal.

A further aspect of the present invention provides a transmitter for a multicarrier transmission system, comprising:

an input for receiving a data signal for transmission;

a mapper arranged to map the received data signal into a set of complex data symbols, where each data symbol determines modulation of one carrier in a set of carriers which are spaced in frequency;

a frequency domain-to-time domain transform stage arranged to convert the set of modulated carriers to a time-domain signal;

a peak detector arranged to detect when the time-domain signal exceeds a predetermined criterion;

a constellation modifier arranged to modify the constellation value of at least one of the carriers in the time-domain.

The present invention also provides a method of reducing the crest factor of a transmitted signal in a multicarrier transmission system which uses a set of carriers spaced apart in frequency, comprising:

inputting a data signal for transmission;

mapping the received data signal into a set of complex data symbols, where each data symbol determines modulation of one carrier in a set of carriers which are spaced in frequency;

performing a frequency domain-to-time domain transform to convert the set of modulated carriers to a time-domain signal;

detecting when the time-domain signal exceeds a predetermined criterion;

modifying the constellation value of at least one of the carriers in the time-domain.

Modifying the multicarrier symbol in the time-domain has an advantage that no further IFFT operations are required, which can reduce the complexity of the processing at the transmitter and therefore cost of the transmitter.

The multicarrier transmission system can be a system which uses a set of orthogonal carriers, such as Discrete Multitone (DMT) or Orthogonal Frequency Division Multiplexing (OFDM) but is not limited to such schemes.

Any of the functionality described here can be implemented in software (e.g. instructions executed by a processor), hardware or a combination of these. Accordingly, another aspect of the invention provides software for controlling operation of a transmitter. The software may be installed on the transmitter at the time of manufacture or commissioning, or it may be installed onto an existing transmitter at a later date as an upgrade. The software may be stored on an electronic memory device, hard disk, optical disk or other machine or computer-readable storage medium. The software may be delivered as a computer program product on a machine-readable carrier or it may be downloaded directly to the transmitter via a network connection.

Accordingly, the present invention can take the form of a computer program product in a computer readable memory for controlling a processor to allow reduction of the crest factor of a transmitted signal in a multicarrier transmission system which uses a set of carriers spaced apart in frequency, each carrier being assigned a number of bits, the computer program controlling the processor to:

receive a data signal for transmission;

map the data signal to a parallel set of constellation values, where each constellation value determines modulation of one carrier in the set of carriers;

apply a frequency domain-to-time domain transform to the set of modulated carriers to generate a time-domain signal;

detect when the time-domain signal exceeds a predetermined criterion;

modify the constellation value of at least one of the carriers, wherein a carrier is selected for adjustment on the basis of a number of bits allocated to that carrier.

Also, the present invention can take the form of a computer program product in a computer readable memory for controlling a processor to allow reduction the crest factor of a transmitted signal in a multicarrier transmission system which uses a set of carriers spaced apart in frequency, the computer program product controlling the processor to:

input a data signal for transmission;

map the received data signal into a set of complex data symbols, where each data symbol determines modulation of one carrier in a set of carriers which are spaced in frequency;

perform a frequency domain-to-time domain transform to convert the set of modulated carriers to a time-domain signal;

detect when the time-domain signal exceeds a predetermined criterion;

modify the constellation value of at least one of the carriers in the time-domain.

BRIEF DESCRIPTION OF THE DRAWINGS

Embodiments of the invention will be described, by way of example only, with reference to the accompanying drawings in which.

DETAILED DESCRIPTION

Figure 1:
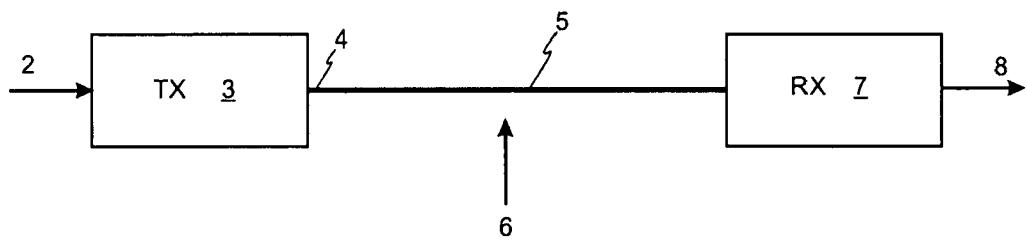
FIG. 1 shows a multicarrier transmission system.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

FIG. 1 shows the basic elements of a multicarrier transmission system. A data signal 2 is applied to a transmitter 3 that uses a multicarrier transmission scheme such as DFT or OFDM. The modulated signal 4 is transmitted over a communications channel 5 and received at a receiver 7. The communications channel can be any suitable channel, e.g. wired or wireless or cordless, optical fiber, radio, microwave, diffuse or beamed infra-red, etc. At the receiver, 7, the received signal is demodulated and decoded to generate an output signal 8. The transmission system can be broadcast or unicast (point-to-point) type. During transmission, disturbances 6 and noise can corrupt the transmitted signal 4. A level of error coding is applied to the signal 2 at the transmitter 3 to cope with the expected amount of disturbance expected during transmission to achieve a suitable bit error rate (BER) in the output signal 8.

Figure 2:
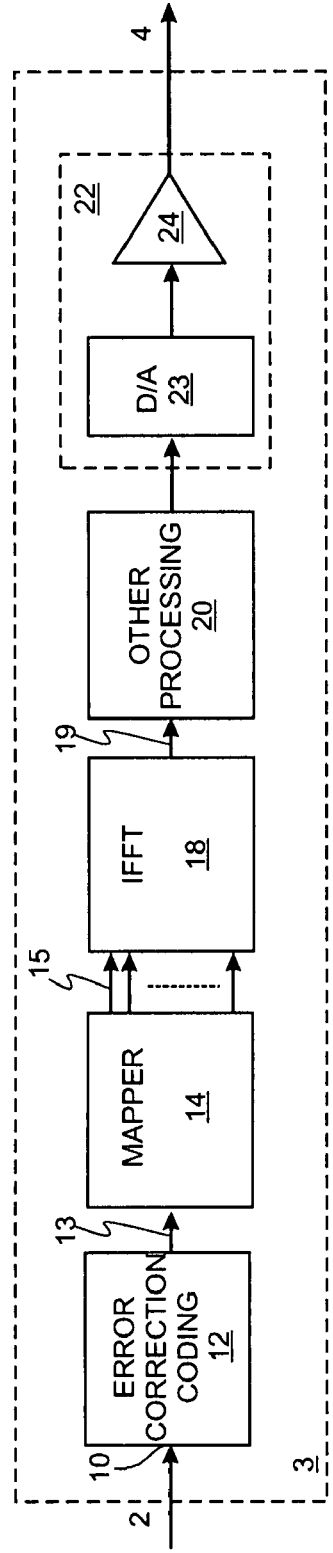
FIG. 2 shows a multicarrier transmitter for use in the system of FIG. 1.

FIG. 2 shows a block diagram of a conventional multicarrier transmitter 3. Multicarrier transmission systems use a set of carriers, i.e. a set of carriers which are regularly spaced apart in frequency and which do not interfere with one another. Each carrier—which can also be called a 'sub-channel' or a 'tone'—is individually modulated. The number of carriers that are used, the type of modulation that is applied to each carrier, and the error correction coding together determine the overall data rate and achievable bit error rate of the system. A data stream 2 is applied to an input 10 of the transmitter 3. Optionally source coding of the data stream can be applied, e.g. to speech. A first block 12 applies error detection coding and/or error correction coding to the data stream 11. The error detection coding and/or error correction coding serves to improve the resilience of the data stream to errors during transmission. Any suitable error detection coding can be used, e.g. checksum. Any suitable error correction coding can be used, such as: Hamming code, Reed-Solomon code, Reed-Muller code, Binary Golay code. Optionally channel coding may be applied. Any suitable channel coding may be used, e.g. block code, convolutional code, turbo code. Optionally, additional techniques may be applied to improve the resilience to channel distortions and/or interference, e.g. interleaving. Any suitable combination of all or some of source coding, error detection and/or error correction coding, channel coding and interleaving can be used.

The coded signal 13 is applied to a mapper/encoder 14. Here, the data 13 is mapped to a parallel set of complex data words. Each of the data words defines the modulation, at that point in time, of one of the set of frequency carriers. A first stage (not shown) of mapper 14 separates a serial steam of data 13 into parallel data words, one (or more) data words per carrier. As will be described in more detail in FIG. 5, each carrier is modulated by a complex value selected from a constellation of possible values, with the selected constellation value corresponding to the data word that needs to be transmitted. This is typically a form of Quadrature Amplitude Modulation (QAM). Codeword vectors 15 (sometimes referred to as 'frequency domain encoded data' or 'constellation values') output from the mapper 14 are then transformed using a suitable frequency domain to time domain transform. For example, an Inverse Fast Fourier Transform processing block 18 can be used but the present invention is not limited thereto. This transforms the set of frequency-domain data to the time-domain. The IFFT processing block 18 outputs samples of an output signal in the time domain. The set of modulated carriers 19, which have been modulated according to one parallel set of data words and hence constellation values, is known as a multicarrier (OFDM/DMT) symbol. In a subsequent symbol, the set of carriers will be modulated by a different set of constellation values. Other processing may occur at block 20 and the processed signal is applied to a digital-to-analog converter (DAC) 23 for conversion to an analog signal, before being applied to other analog front-end components such as an optional upconverter and a power amplifier 24. The resulting analog signal 4 is output for transmission. In this embodiment the error correction coding is applied within transmitter 3 by block 12. Alternatively (or additionally) the signal 2 arriving at transmitter 3 can already include a certain level of error correction coding.

Figure 3:
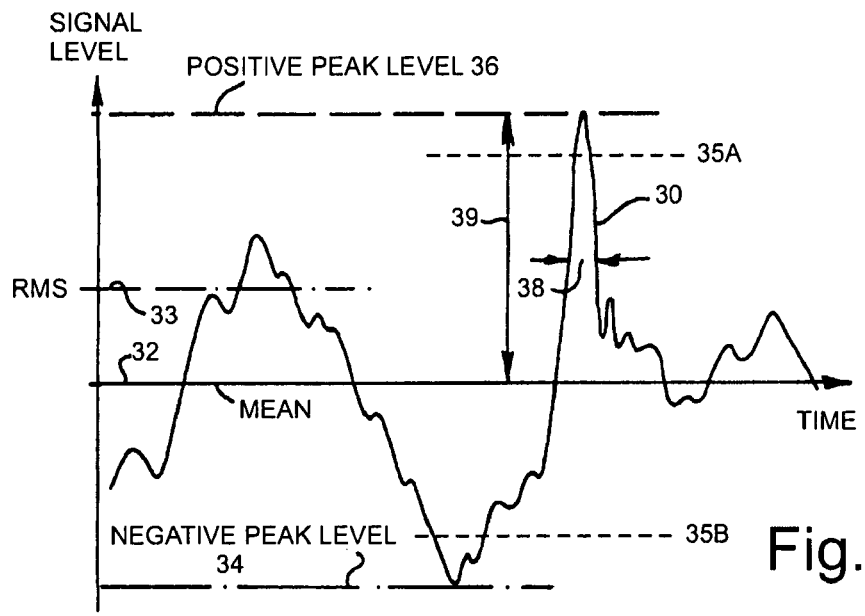
FIG. 3 shows a time-domain representation of a multicarrier signal.

FIG. 3 shows a time-domain representation 20 of a signal output from the IFFT block 18. This signal represents the sum of individual time-domain signals which each correspond to one of the carriers. It is this signal which can have a large crest factor. The time domain representation 30 has a signal level that oscillates about a mean signal level 32, with the oscillations dipping aperiodically to a negative peak level 34 and aperiodically rising to a maximum (positive) peak level 36. The maximum (positive) peak level 36, or the negative peak level 34, potentially represents a sample in the symbol that will cause clipping in the DAC 23, with the peak typically having a short time duration 38. As will be appreciated, the ratio of the peak 36 to a root mean square (RMS) value 33 represents the crest factor (PAR) for a DMT signal.

Figure 4:
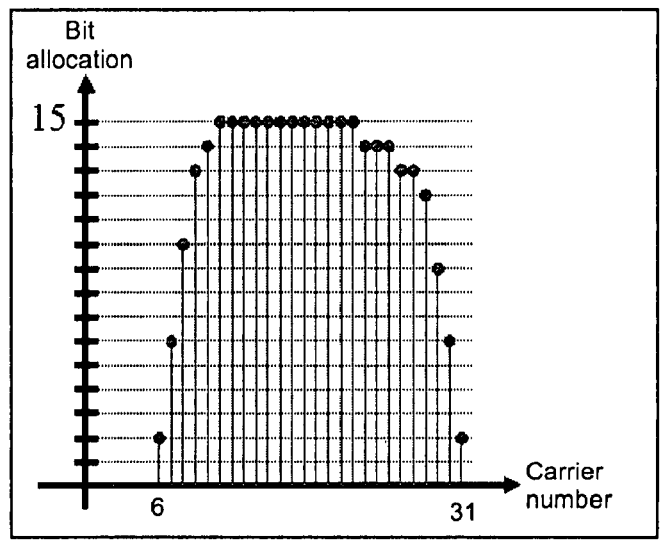
FIG. 4 shows an example allocation of bits to carriers in a multicarrier transmission scheme.

As noted above, it is not necessary to allocate the same number of bits to each carrier in a multicarrier transmission scheme. FIG. 4 shows an example bit allocation to carriers for the upstream channel of an ADSL system. There are a total of 32 carriers, with carriers 6 through to 31 being used to carry data. Generally, it is found that the carriers at the upper and lower sides of the spectrum are limited by inter-symbol-interference (ISI) and have lower SNR than the other carriers. In the example shown in FIG. 4 the bit loading across the carriers is 322 bits, i.e. one OFDM/DMT symbol comprises 322 bits. The bits (b) are allocated as 2×2b (carriers 6, 31)+ 2×6b (carriers 7, 30)+1×9b (carrier 29)+1×10b (carrier 8)+1× 12b (carrier 28)+3×13b (carriers 9, 26, 27)+4×14b (carriers 10, 23, 24, 25)+12×15b (carriers 11-22).

Figure 5:
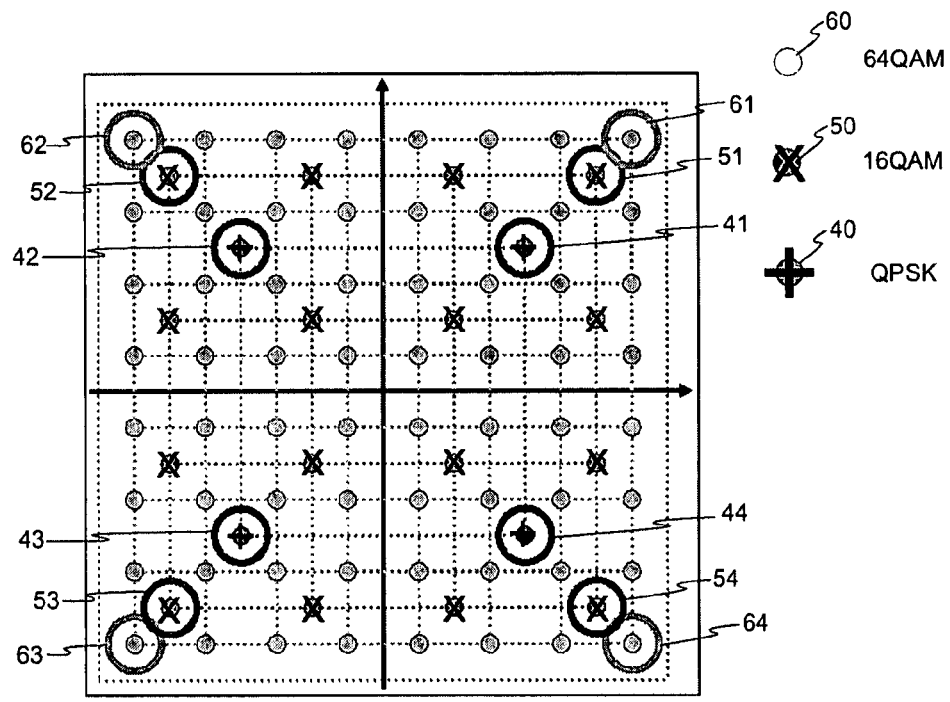
FIG. 5 shows a constellation diagram of a modulation scheme which can be applied to a carrier.

FIG. 5 shows three possible QAM constellations 40, 50, 60 that can be used to modulate a carrier. Although the three schemes are shown together in this diagram for comparison, only one of these constellations would be used to modulate a single carrier. Constellation 40 has four possible values (4 QAM or QPSK), constellation 50 has 16 possible values (16 QAM) and constellation 60 has 64 possible values (64 QAM). During each OFDM/DMT symbol, a carrier will be modulated with one constellation value selected from the set of possible constellation values available to that constellation. For those carriers which only need to carry a small number of bits, constellation 40 can be used, while for those carriers which are required to carry a higher number of bits constellations 50 or 60 could be used. Although this example shows a maximum constellation size of 64, it will be appreciated that modulation schemes with greater constellation sizes can be used. Also, although not shown, the constellation for a carrier which carries only 1 bit will have just two constellation positions opposite one another (e.g. similar to positions 41, 43).

Figure 6:
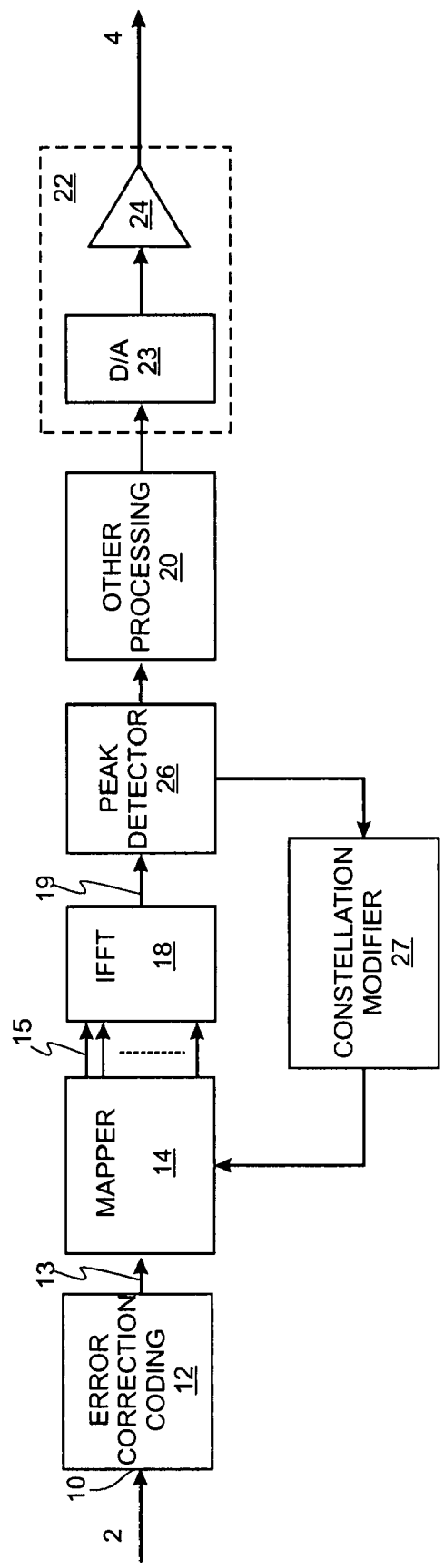
FIG. 6 shows a first embodiment of a transmitter which can modify a constellation value.

An improved transmitter in accordance with one embodiment of the invention will now be described with reference to FIG. 6. The apparatus is generally as previously shown and described with reference to FIG. 2. A peak detector 26 is positioned after the IFFT block 18 and is responsive to the time-domain multicarrier symbols 19 output by the IFFT block 18. These multicarrier symbols, in the time domain, have the form shown in FIG. 3, with occasional peaks 38 and 34. Peak detector 26 monitors the output of the IFFT block 18 and determines when the output signal exceeds predetermined criterion, e.g. the signal level exceeds a certain amplitude (in a positive or negative direction). FIG. 3 shows two example threshold levels 35A, 35B which may be used by the peak detector 26. When a peak is detected (e.g. signal level rises above threshold level 35A or falls below threshold level 35B), the peak detector 26 instructs the mapper 14 to modify the mapping for the symbol in which the peak occurred. The mapper 14 is aware of the bit loading on each of the carriers. Any suitable scheme can be used to derive the information about the number bits allocated to each carrier. To give a few examples, this information can be derived during initialization of the communication link, it can be carried in a message header or it can be defined in a standard.

One of the carriers having the lowest number of bits is selected as a candidate for modifying. In the example bit loading shown in FIG. 4, this will be carrier 6 or carrier 31. In the simplest embodiment, the constellation value of that carrier is modified to four alternative constellation positions. For each alternative constellation position of that carrier, the IFFT 18 is performed again and the resulting time-domain symbol monitored by the peak detector 26. It is likely that one of these alternative constellation positions will reduce the peak to an acceptable level. The symbol having the lowest peak is selected for further processing and transmission. The new constellation value no longer correctly relates to the data word that was applied to the mapper for that carrier and can, or will, cause a bit error at receiver 7. However, some data streams are naturally resilient to errors, e.g. speech and where error correction coding 12 has been applied to the signal, this can accommodate a certain level of bit errors and the overall benefit to the BER is significantly greater than clipping the entire multicarrier symbol. The number of possibilities to create a new symbol depends on the constellation size of the carrier to be modified. In accordance with an embodiment of the present invention not all of these alternatives are tried. For example, it is preferred that the alternative constellation values selected in this method are at the four outermost corners of the constellation diagram. For the QPSK constellation, these are points 41, 42, 43, 44 (which happen to be the only positions in this constellation). For the 16QAM constellation, the alternative constellation values are points 51, 52, 53, 54 (out of the 16 total constellation positions). For the 64QAM constellation, the alternative constellation values are points 61, 62, 63, 64 (out of the 64 total constellation positions.) The outermost constellation positions are chosen as these are the constellation positions that have greatest signal amplitude are likely to have maximum effect on the peak in the multicarrier symbol. This process of finding alternative constellation values requires a maximum of 4 extra IFFT operations—one IFFT per alternative constellation value. If, following this method, the time-domain multicarrier symbol still has an unacceptably high peak, a second carrier is selected having the second fewest bits allocated to it (e.g. the other one of carriers 6, 31 not selected on the first occasion). Again, alternative constellation values are selected, an IFFT computed for each value, and the resulting time-domain multicarrier symbols are monitored. This requires a maximum 8 IFFT operations. In general, $$\text{number of extra IFFT operations} = 4 * \text{number\_of\_modified\_tones}.$$

If a symbol is remapped the buffer containing the symbol with an unacceptable peak is deleted or overwritten with the new (remapped) symbol.

A disadvantage of the above described scheme is that the IFFT block 18 is required to operate at a higher rate than normal (e.g. 4 or 8 times). An improvement to the above method will now be described. As before, peak detector 26 detects when a time-domain multicarrier symbol has a peak which is too high. The position of the peak is determined. As before, the tone (or tones) with the lowest number of bits mapped to them is selected for modifying. The maximum and minimum positions of the time-domain representation of this carrier are known (see detailed working below). The phase of the carrier can be modified to have a peak of opposite polarity at the required position, i.e. instead of having a positive-going peak (maxima) at time x, the signal has a negative-going peak (minima).

Example of a Wired Transmission (Real Signal):
number of carriers=N
selected carrier=k (and its mirror −k, because it's a real transmission) the maxima (positive peaks) for the first quadrant are the positions where:

$$\frac{e^{j\left(\frac{2\cdot\pi\cdot k\cdot n}{N}+\frac{\pi}{4}\right)} + e^{-j\left(\frac{2\cdot\pi\cdot k\cdot n}{N}+\frac{\pi}{4}\right)}}{2} \equiv +1 \Rightarrow \cos\left(\frac{2\cdot\pi\cdot k\cdot n}{N}+\frac{\pi}{4}\right) \equiv +1$$

$T$ is integer $$\Rightarrow \frac{2\cdot\pi\cdot k\cdot n}{N}+\frac{\pi}{4} \equiv 2\cdot T\cdot\pi$$

$$\Rightarrow n \equiv \left(T-\frac{1}{8}\right)\cdot\frac{N}{k}$$

For k=4 and N=512 the maxima are found at:

$$n = \frac{7}{8} \cdot \frac{512}{4} = 112$$

$$n = \frac{15}{8} \cdot \frac{512}{4} = 240$$

$$n = \frac{23}{8} \cdot \frac{512}{4} = 368$$

$$n = \frac{31}{8} \cdot \frac{512}{4} = 496$$

Figure 7:
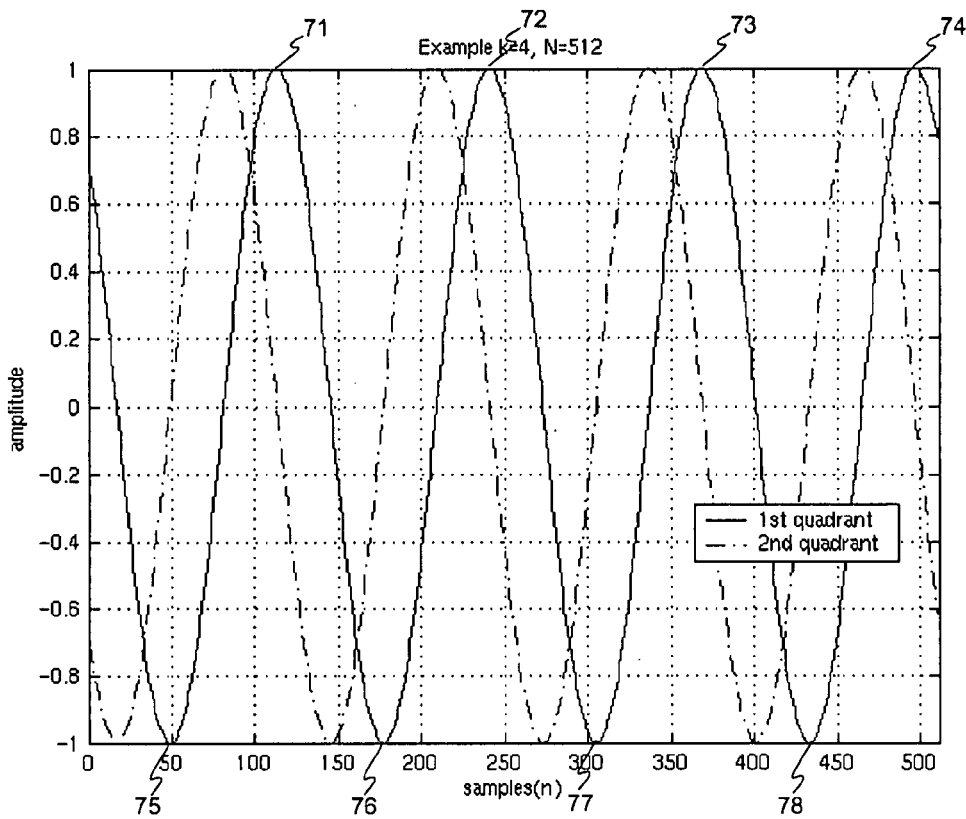
FIG. 7 shows a time domain representation of a single one of the carriers used in the transmission scheme.

FIG. 7 shows a time-domain representation of the carrier, with the solid curve representing the first quadrant. Only two quadrants are shown in FIG. 7 rather than four but this is for only for clarity purposes, i.e. not to overcomplicate this figure. It can be seen that the position of the maxima (positive peaks) 71, 72, 73, 74 corresponds to that computed above. The minima (peaks of negative polarity) are shown at positions 75, 76, 77, 78. The broken line represents the second quadrant. Similar to above, it is possible to calculate the position of maxima and minima for the second quadrant (plotted in FIG. 7) as well as the third and fourth quadrants. The quadrant of the cosine wave is selected which has a peak closest to the position of the peak in the multicarrier symbol (with the peak of the cosine wave being of the opposite polarity to the peak in the multicarrier symbol). It is noted that in this method one of four (valid) constellation values are used. As a result of this, the position of the peak in the cosine wave and the peak in the multicarrier symbol may not always exactly coincide. If the standard governing the transmission scheme allows a transmitted carrier to have any constellation value (i.e. the carrier can have an amplitude and phase which does not correspond to any of the amplitude/phase values which define the valid set of constellation values) then it is possible to provide a peak in the selected carrier at a position which is exactly aligned with the peak (of opposite polarity) in the multicarrier symbol.

This method requires only one extra IFFT operation since, due to the analysis of the selected carrier, it is known that the modified carrier will reduce the peak in the multicarrier symbol. If, following one iteration of this method, the peak in the multicarrier symbol is still too high a second tone is selected and the optimal phase of the carrier is computed as before. This requires 2 extra IFFT operations. In general:

number of extra IFFT operations=
number_of_modified_tones.

There are possibilities to estimate the number of modified tones, for example by checking the peak amplitude. This can significantly reduce the number of extra IFFT operations needed. As an example, it may be assumed that every modified tone contributes a peak reduction of 0.4 db so that:

$$\text{number of tones to modify} = \frac{\text{required\_peak\_reduction}}{0.4\,\text{dB}}$$

The relationship between the number of modified tones and the amount of peak reduction can be heuristically determined and stored in a memory of the transmitter. The heuristic determination can be made by an individual transmitter or can be made by the system and results sent to individual transmitters for storage and use by those transmitters.

Figure 8:
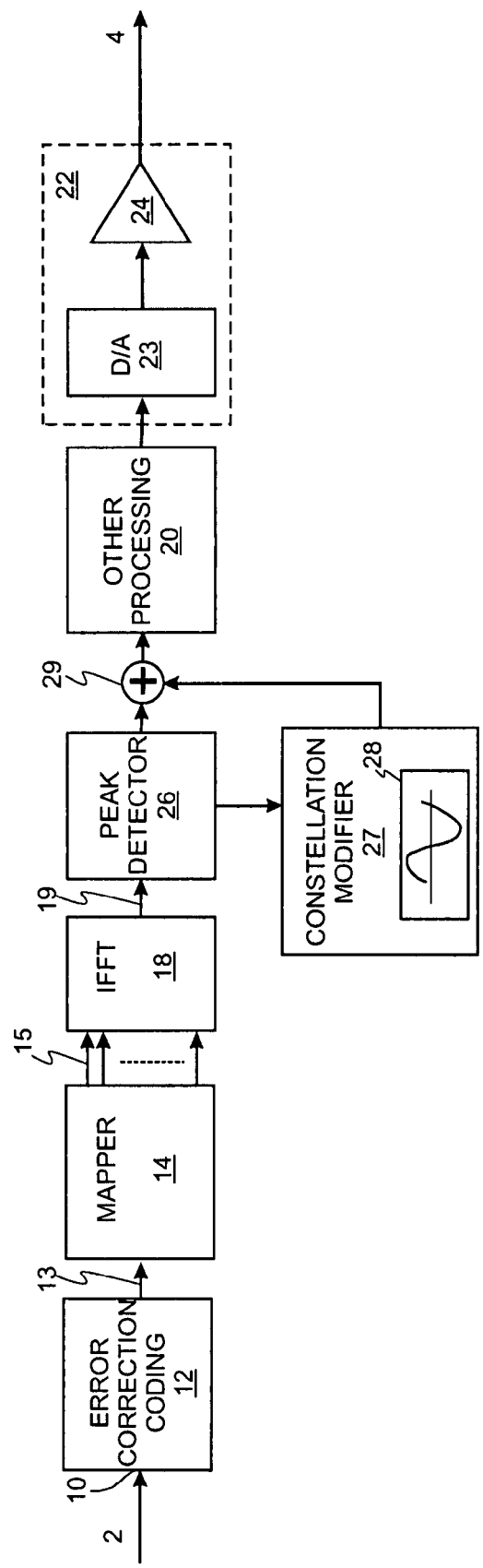
FIG. 8 shows a second embodiment of a transmitter which can modify a constellation value.

In the above methods a multicarrier symbol such as an OFDM symbol is modified by causing a mapper to output modified constellation value on a particular carrier, or carriers, and by recalculating the IFFT with those modified values. An alternative technique will now be described which has an advantage of avoiding the need to recalculate the IFFT as all of the modifying of the multicarrier symbol occurs in the time-domain, after IFFT block 18. FIG. 8 shows apparatus. As before, a peak detector 26 is positioned after the frequency domain to time domain transform block, e.g. an IFFT block, and detects a peak in the time-domain multicarrier symbol. A precomputed time-domain representation of a signal corresponding to a modulated carrier is stored in memory 28, e.g. a stored cosine wave. When a peak is found, the following is carried out:

a carrier is selected for modifying based on the number of bits allocated to that carrier;

the stored cosine wave is scaled and rotated to reflect the current constellation value of the selected carrier and is subtracted from the multicarrier symbol to thereby remove the selected carrier. It is noted that the constellation value of a carrier determines the amplitude and phase of the carrier. Since the mapper 14 has just allocated a constellation value to each carrier, the constellation modifier 27 can use this information to scale and rotate the stored cosine wave into the required position to cancel the selected carrier.

the stored cosine wave is cyclically permuted to align a peak (of required polarity) in a required position. There are two possibilities:
(i) if the transmission scheme requires valid constellation values to be transmitted the method is as before. The only difference is that the multicarrier symbol is generated directly in the time domain, and does not require an IFFT operation.
(ii) if the transmission scheme does not require valid constellation values to be transmitted the peak of the cosine wave can be aligned exactly with the peak in the multicarrier symbol.

the aligned cosine wave is added 29 to the time-domain signal.

Of course, as before, the peak in the cosine wave is of the opposite polarity to the peak in the multicarrier symbol which needs to be cancelled (i.e. a negative peak in the cosine wave is aligned with a positive peak in the multicarrier symbol and a positive peak in the cosine wave is aligned with a negative peak in the multicarrier symbol.)

While constellation modifier 27 can store a time-domain representation of each of the carriers used within the transmission scheme, there is a simpler method which requires only one cosine wave to be stored 28. From the single stored cosine wave, a time-domain signal representing a carrier of any carrier frequency, amplitude and phase can be derived. Assume now that the stored cosine wave has a phase of 0rad and an amplitude of 1. In order to match the amplitude a multiplier can be used, in order to match the phase the reading out of the buffer has to be started at a different position than zero (assume n=512, k=time index, f=carrier frequency index, p*pi=phase):

$$\text{stored\_cos}(k) = \cos(2*pi*k/512)$$

$$\begin{aligned}\text{general\_cos}(k, f, p) &= \cos(2*pi*k*f/512 + p*pi)\\ &= \cos(2*pi*[k*f/512 + p/2])\\ &= \cos(2*pi*[k*f + 256*p]/512)\\ &= \text{buffer\_contents}(k*f + 256*p)\end{aligned}$$

Some examples will now be explained in detail to illustrate the effect of the improved methods described above. In this section ADSL is used as an example, but the invention is not limited to ADSL and can also apply to any other multicarrier system, e.g. DMT or OFDM system.

1st EXAMPLE

Using the bit allocation shown in FIG. 4, the 1 (2) tone(s) having the fewest bits are selected for modifying. Each of these tones carries only 2 bits of data. This will result in 2 (4) bits being decoded wrongly.

If the symbol was clipped, as in the prior art, it is very likely that all tones carrying more than 13 bits are destroyed (tones 9-27). In this example this equals 236 bits.

The invention in this case gives rise to ~120 (~60) times less corrupted bits than hard clipping. The reason for all tones having >13 bits being destroyed is that those tones (carriers) have a larger constellation which is more susceptible to corruption.

2nd EXAMPLE

In a worst case, where all carriers have the maximum (equal) number of bits allocated to them, 1 (2) modified carrier(s) have 15 bits mapped on them and so in total 15 (30) bits will be decoded wrongly opposed to 236 bits. This is still ~16 (~8) times less corrupted bits than hard clipping.

Figure 9:
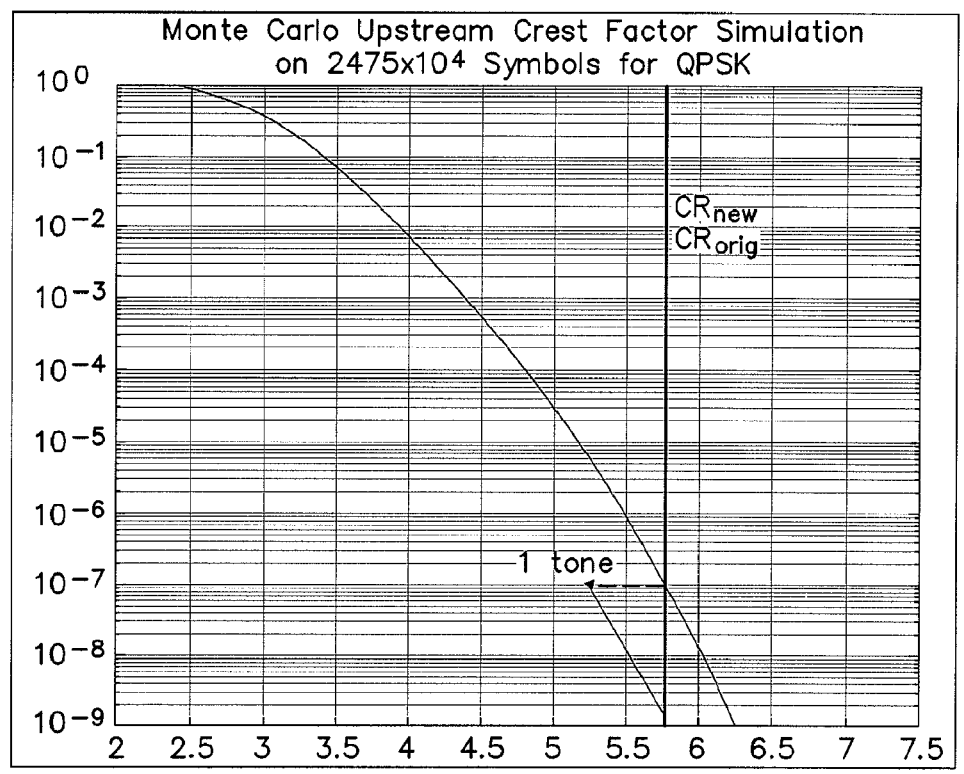
FIGS. 9 and 10 show performance of the improved schemes in accordance with the present invention.

Empirically it is noticed that, in this example, using 1 tone reduces the crest factor by 0.75 dB and using 2 tones by 1.5 dB. The ADSL standard requires a BER of 1E-7. With respect to hard clipping this could be translated as: maximum 1 symbol out of 1E7 can be clipped in order not to exceed the standard requirement. FIG. 9 shows the clipping probability of a typical upstream ADSL signal. The minimum clipping ratio should be 5.7 (~15.1 dB) not to exceed a BER of 1E-7.

There are in general at least two ways of using this invention: either reducing the BER for the same clipping ratio or reducing the clipping ratio for the same BER. The second option is often the most useful.

Case 1: Same Clipping Ratio, Reduced BER (FIG. 9)
Using one tone reduces the crest factor by about 0.75 dB. This means that a clipping probability of 1E-7 corresponds to a clipping ratio of 5.2 (~14.35 dB). From the previous examples it is clear that only a fraction of the symbol is corrupted, so the corresponding BER of the first and second example (in the case where only 1 tone is used) are 8.3E-10 (=1E-7/120) and 6.25E-9 (=1E-7/16) respectively.

Figure 10:
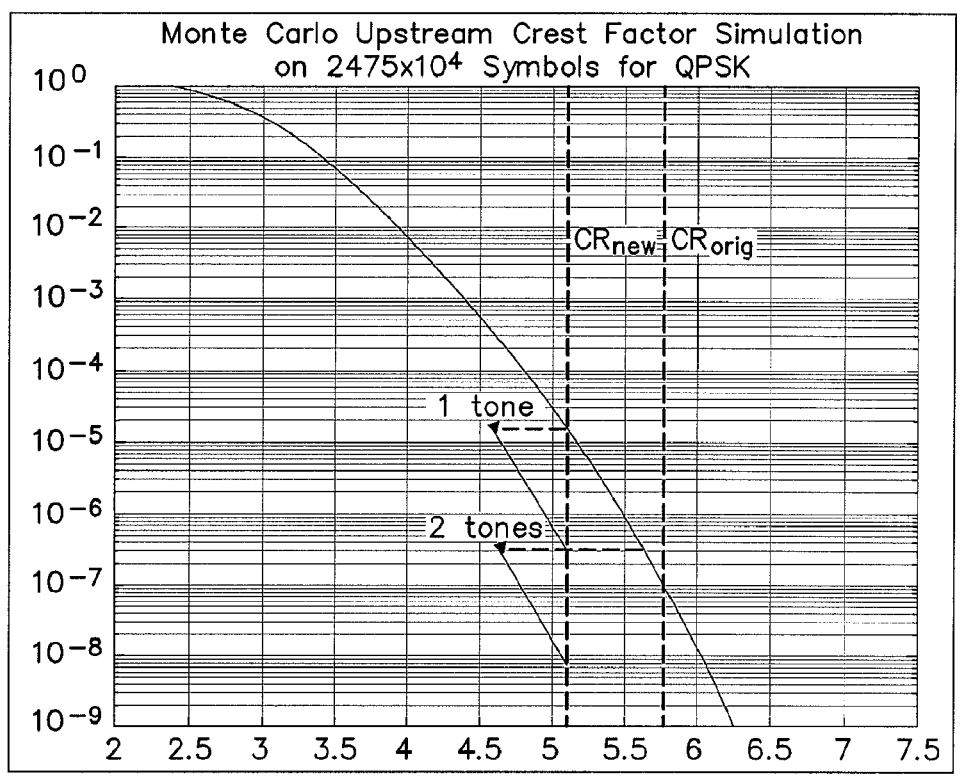

Case 2: Same BER, Reduced Clipping Ratio (FIG. 10)
In the first example about 60 symbols out of 1E7 (when using two tones) can be 'clipped' in order not to exceed the standard requirement. The clipping probability (60/1E7) corresponds to a minimum clipping ratio of 5.2 (~14.3 dB). When only one tone is used this corresponds to a minimum clipping ratio of 5.1 (~14.2 dB), but of course the crest reduction is less (~0.75 dB). In this example the crest factor has been reduced by 1 dB.

The transmitter which has been described above can be implemented as a program running on a processing platform. The processing platform can be a general purpose platform such as a personal computer or one which is optimized to implement the functional elements within the transmitter. The transmitter can be implemented as an integrated circuit which includes the processor and memory for storing control instructions to cause the processor to perform the above described tasks. The instructions can be arranged as code modules which perform the tasks. The processor can be implemented as an integrated circuit comprising an embedded processor such as a programmable, or reconfigurable, gate array or any other suitable processing means.

The invention is not limited to the embodiments described herein, which may be modified or varied without departing from the scope of the invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

The invention is limited only as defined in the following claims and the equivalents thereto.

What is claimed is:

1. A transmitter for a multicarrier transmission system which uses a set of carriers spaced apart in frequency, the transmitter comprising:
   an input for receiving a data signal for transmission;
   a mapper arranged to map the data signal to a parallel set of constellation values, where each constellation value determines modulation of a respective carrier in the set of carriers;
   a frequency domain-to-time domain transform stage arranged to convert the set of modulated carriers to a time-domain signal;
   a peak detector arranged to detect when the time-domain signal exceeds a predetermined criterion; and
   a constellation modifier configured to select a carrier from the set of carriers according to a number of bits allocated to the selected carrier and to modify a constellation value of the selected carrier to alter the time-domain signal that exceeds the predetermined criterion.

2. A transmitter according to claim 1, wherein the constellation modifier is arranged to select the selected carrier having the fewest bits allocated to it.

3. A transmitter according to claim 1, wherein the constellation modifier is arranged to select at least two carriers having the fewest bits allocated to them.

4. A transmitter according to claim 1, wherein the constellation modifier is arranged to select a plurality of predetermined alternative constellation values and the peak detector is arranged to determine the best one of the alternative constellation values based on the effect of the alternative constellation value on the time-domain signal.

5. A transmitter according to claim 4, wherein the predetermined alternative constellation values are the constellation values of largest amplitude.

6. A transmitter according to claim 1, wherein the constellation modifier is arranged to modify the constellation value only to a valid constellation value.

7. A transmitter according to claim 1, wherein the constellation modifier is arranged to cause the mapper to use a modified constellation value for the selected carrier and the frequency domain-to-time domain transform stage is arranged to convert the modified set of modulated carriers to a time-domain signal after each modification.

8. A transmitter according to claim 1, wherein the constellation modifier is arranged to select a modified constellation value which will place a peak of opposite polarity at, or near to, the position of a peak in the time-domain signal.

9. A transmitter according to claim 1, wherein the constellation modifier is arranged to modify the constellation value of at least one of the carriers in the time-domain.

10. A transmitter according to claim 9, wherein the constellation modifier comprises a store holding a time-domain representation of a carrier and the constellation modifier is arranged to remove the selected carrier from the time-domain signal and to add the stored time-domain representation of a carrier to the signal at a relative phase which will place a peak of opposite polarity at, or substantially at, the position of a peak in the time-domain signal.

11. A transmitter according to claim 10, wherein the constellation modifier is arranged to remove the selected carrier from the time-domain signal by subtracting a scaled and time-shifted version of the time-domain representation of the carrier from the signal.

12. The apparatus of claim 1 wherein a clipping ratio for the transmitter has been reduced as compared with a transmitter that does not modify the constellation value of the selected carrier responsive to a detection of a peak exceeding the predetermined criteria.

13. The apparatus of claim 1 wherein the constellation modifier is arranged to modify the constellation value of the selected carrier responsive to a detection of a peak exceeding the predetermined criteria.

14. A method of reducing the crest factor of a transmitted signal in a multicarrier transmission system which uses a set of carriers spaced apart in frequency, the method comprising:
receiving, by a transmitting device, a data signal for transmission;
mapping the data signal to a parallel set of constellation values, where each constellation value determines modulation of a respective carrier in the set of carriers;
applying a frequency domain-to-time domain transform to the set of modulated carriers to generate a time-domain signal;
detecting when the time-domain signal exceeds a predetermined criterion;
selecting a carrier from the set of carriers according to a number of bits allocated to the selected carrier; and
modifying a constellation value of the selected carrier to alter the time-domain signal that exceeds the predetermined criterion.

15. Non-transitory machine-readable storage medium comprising instructions for causing a processor to perform the method according to claim 14.

16. The method of claim 14 further comprising determining the number of carriers to modify based upon a peak signal level of the time-domain signal.

17. The method of claim 16, wherein the determining comprises determining heuristically a relationship between a number of carriers to modify and an amount of peak reduction.

18. The method of claim 17 further comprising storing the relationship in a memory of the transmitting device of the multicarrier transmission system.

19. The method of claim 14, wherein the modifying further comprises altering the amplitude and/or phase of a single cosine wave stored in a memory to provide a modified at least one of the carriers.

20. A transmitter for a multicarrier transmission system, comprising:
an input for receiving a data signal for transmission;
a mapper arranged to map the received data signal into a set of complex data symbols, where each data symbol determines modulation of a respective carrier in a set of carriers which are spaced in frequency;
a frequency domain-to-time domain transform stage arranged to convert the set of modulated carriers to a time-domain signal;
a peak detector arranged to detect when the time-domain signal exceeds a predetermined criterion;
a constellation modifier arranged to modify a constellation value of at least one of the carriers in the time-domain to alter the time-domain signal that exceeds the predetermined criterion.

21. A transmitter according to claim 20, wherein the constellation modifier comprises a store holding a time-domain representation of the at least one of the carriers and the constellation modifier is arranged to remove the at least one of the carriers from the time-domain signal and to add the stored time-domain representation of a carrier to the signal at a relative phase which will place a peak of opposite polarity at, or substantially at, the position of a peak in the time-domain signal.

22. A transmitter according to claim 21, wherein the constellation modifier is arranged to remove the at least one of the carriers from the time-domain signal by subtracting a scaled and time-shifted version of the time-domain representation of the at least one of the carriers from the signal.

23. A method of reducing the crest factor of a transmitted signal in a multicarrier transmission system which uses a set of carriers spaced apart in frequency, comprising:
inputting, to a transmitting device, a data signal for transmission;
mapping the received data signal into a set of complex data symbols, where each data symbol determines modulation of a respective carrier in a set of carriers which are spaced in frequency;
performing a frequency domain-to-time domain transform to convert the set of modulated carriers to a time-domain signal;
detecting when the time-domain signal exceeds a predetermined criterion;
modifying a constellation value of at least one of the carriers in the time-domain to alter the time-domain signal that exceeds the predetermined criterion.

24. Non-transitory machine-readable storage medium comprising instructions for causing a processor to perform the method according to claim 23.

25. A system for multicarrier communication which uses a set of carriers spaced apart in frequency, the system comprising:
at least one transmitter for multicarrier transmission; and
at least one receiver configured to receive a multicarrier signal from the at least one transmitter, the at least one transmitter comprising:
an input for receiving a data signal for transmission;
a mapper arranged to map the data signal to a parallel set of constellation values, where each constellation value determines modulation of a respective carrier in the set of carriers;
a frequency domain-to-time domain transform stage arranged to convert the set of modulated carriers to a time-domain signal;
a peak detector arranged to detect when the time-domain signal exceeds a predetermined criterion; and
a constellation modifier arranged to select a carrier from the set of carriers according to a number of bits allocated to the selected carrier and modify a constellation value of the selected carrier to alter the time-domain signal that exceeds the predetermined criterion.

26. The system of claim 25, wherein the constellation modifier is arranged to select the selected carrier having the fewest bits allocated to it.

27. The system of claim 25, wherein the constellation modifier is arranged to select at least two carriers having the fewest bits allocated to them.

28. The system of claim 25, wherein the constellation modifier is arranged to select a plurality of predetermined alternative constellation values and the peak detector is arranged to determine the best one of the alternative constellation values based on the effect of the alternative constellation value on the time-domain signal.

29. The system of claim 28, wherein the predetermined alternative constellation values are the constellation values of largest amplitude.

30. The system of claim 25, wherein the constellation modifier is arranged to modify the constellation value only to a valid constellation value.

31. The system of claim 25, wherein the constellation modifier is arranged to cause the mapper to use a modified constellation value for the selected carrier and the frequency domain-to-time domain transform stage is arranged to convert the modified set of modulated carriers to a time-domain signal after each modification.

32. The system of claim 25, wherein the constellation modifier is arranged to select a modified constellation value which will place a peak of opposite polarity at, or near to, the position of a peak in the time-domain signal.

33. The system of claim 25, wherein the constellation modifier is arranged to modify the constellation value of the selected carrier in the time-domain.

34. The system of claim 33, wherein the constellation modifier comprises a store holding a time-domain representation of a carrier and the constellation modifier is arranged to remove the selected carrier from the time-domain signal and to add the stored time-domain representation of a carrier to the signal at a relative phase which will place a peak of opposite polarity at, or substantially at, the position of a peak in the time-domain signal.

35. The system of claim 34, wherein the constellation modifier is arranged to remove the selected carrier from the time-domain signal by subtracting a scaled and time-shifted version of the time-domain representation of the carrier from the signal.

* * * * *